US011886326B2

United States Patent
Hegarty et al.

(10) Patent No.: US 11,886,326 B2
(45) Date of Patent: Jan. 30, 2024

(54) CONFIGURING TEST OPERATIONS ON A PER-MODULE BASIS

(71) Applicant: Oracle International Corporation, Redwood Shores, CA (US)

(72) Inventors: Chris Hegarty, Dublin (IE); Daniel Jean-Michel Fuchs, Dublin (IE); Sean James Coffey, Dublin (IE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 234 days.

(21) Appl. No.: 16/135,210

(22) Filed: Sep. 19, 2018

(65) Prior Publication Data

US 2020/0089599 A1    Mar. 19, 2020

(51) Int. Cl.
*G06F 11/36* (2006.01)
*G06F 12/00* (2006.01)
*G06F 9/455* (2018.01)

(52) U.S. Cl.
CPC ...... *G06F 11/3684* (2013.01); *G06F 9/45558* (2013.01); *G06F 11/3664* (2013.01)

(58) Field of Classification Search
CPC .... G06F 11/3684; G06F 11/36; G06F 11/362; G06F 11/3664; G06F 11/3688; G06F 11/2668

See application file for complete search history.

(56) References Cited

U.S. PATENT DOCUMENTS

| | | | | |
|---|---|---|---|---|
| 8,146,057 | B1 * | 3/2012 | Michelsen | G06F 11/3696 717/124 |
| 2004/0054695 | A1 * | 3/2004 | Hind | G06F 11/3636 |
| 2007/0079291 | A1 * | 4/2007 | Roth | G06F 11/3668 717/124 |
| 2007/0168975 | A1 * | 7/2007 | Kessler | G06F 11/362 717/124 |
| 2007/0220492 | A1 * | 9/2007 | Brugiolo | G06F 11/3612 717/126 |
| 2010/0251214 | A1 * | 9/2010 | Bohling | G06F 11/3604 717/124 |
| 2011/0219359 | A1 * | 9/2011 | Gupta | G06F 9/44 717/124 |
| 2016/0140023 | A1 * | 5/2016 | Michelsen | G06F 3/04842 717/125 |

(Continued)

*Primary Examiner* — Lewis A Bullock, Jr.
*Assistant Examiner* — Mohammad H Kabir
(74) *Attorney, Agent, or Firm* — Invoke

(57) ABSTRACT

Techniques for configuring test operations on a per-module basis are disclosed. A system receives a command for configuring, on a per-module basis, test operations recited in a set of module code corresponding to a particular module of a plurality of modules in a module system. The module system specifies accessibility of each module in the plurality of modules to other modules in the plurality of modules. The system stores configuration information based on the command and configures a test operation included in an element of the particular module based on the stored configuration information. Configuring the test operation includes one of: (a) enabling the test operation without affecting other code recited in-line with the test operation in the element of the particular module; or (b) disabling the test operation without affecting other code recited in-line with the test operation in the element of the particular module.

21 Claims, 10 Drawing Sheets

(56) References Cited

U.S. PATENT DOCUMENTS

2016/0292061 A1* 10/2016 Marron ................. G06F 11/362
2018/0060226 A1* 3/2018 Siggers ............... G06F 11/3692
2019/0317887 A1* 10/2019 Wiener ............... G06F 11/3664

* cited by examiner

FIG. 5

Module system 500

Module
502

Module Descriptor
503

Exposed Package
504

Class
506

Private Package
508

Class
510

Module
512

Module Descriptor
513

Exposed Package
514

Class
516

Private Package
518

Class
520

CONFIGURING TEST OPERATIONS ON A PER-MODULE BASIS

TECHNICAL FIELD

The present disclosure relates to test operations. In particular, the present disclosure relates to configuring test operations.

BACKGROUND

In software development, a test operation supplies information that may be used to troubleshoot, optimize, or otherwise improve upon code that is recited inline with the test operation. Test operations may include, but are not limited to: assertions; logging operations; breakpoints; print statements; or any other kind of test operation or combination thereof.

As one example of a test operation, an assertion is an operation that evaluates as true or false. Typically, a programmer designs an assertion to succeed, i.e., evaluate as true, when one or more expected criteria are satisfied. For example, a Java method may require that a numerical variable x have a value greater than zero. The test operation 'assert x>0;' evaluates as true when the requirement is satisfied. An assertion fails when it evaluates as false, indicating that the one or more criteria are not satisfied. In the preceding example, the assertion fails if x is less than or equal to zero. When an assertion fails, depending on the programming language used, the runtime environment may throw an exception, log an error, output an error to a command line or other user interface component, crash, or take some other action or combination thereof to indicate that the assertion failed. In Java, when an assertion fails, the Java Runtime Environment throws an AssertionError instance. Other program code may catch and handle the AssertionError instance. Alternatively, the AssertionError instance may be left unhandled, in which case the runtime environment may print the error and stack trace, and terminate the thread in which the error occurred.

When running a computer program, a user may configure one or more kinds of test operations to be enabled or disabled. For example, a user may enable test operations while developing, testing, and/or troubleshooting the computer program. Rather than enabling test operations for the entire computer program, the user may seek to enable test operations only for a subset of code of particular interest. Enabling test operations for other parts of the code may result in unexpected and/or undesirable program behavior. For example, consider a user who is testing code in a particular package. In this example, the user wishes to enable assertions in that particular package, to determine whether expected criteria are satisfied at runtime. If the user also enables assertions in another package, those assertions may interfere (e.g., by throwing an exception when an assertion fails) with the user's testing of the particular package of interest. In general, an inability to designate, reliably and predictably, which test operations are enabled or disabled may impede or obstruct the troubleshooting, optimization, and/or other work to be performed on a given set of code.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

[6] The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates a module system in block diagram form according to an embodiment;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULES
4. EXAMPLES OF PACKAGE TREE HIERARCHIES
5. CONFIGURING TEST OPERATIONS ON A PER-MODULE BASIS
6. EXAMPLES OF COMMAND LINE INTERFACE ARGUMENTS
7. MISCELLANEOUS; EXTENSIONS
8. HARDWARE OVERVIEW
9. COMPUTER NETWORKS AND CLOUD NETWORKS
10. MICROSERVICE APPLICATIONS

1. General Overview

One or more embodiments include techniques for configuring test operations on a per-module basis are disclosed. A system receives a command for configuring, on a per-module basis, test operations recited in a set of module code corresponding to a particular module of a plurality of modules in a module system. The module system specifies accessibility of each module in the plurality of modules to other modules in the plurality of modules. The system stores configuration information based on the command and configures a test operation comprised in an element of the particular module based on the stored configuration information. Configuring the test operation includes one of: (a) enabling the test operation without affecting other code recited in-line with the test operation in the element of the particular module; or (b) disabling the test operation without affecting other code recited in-line with the test operation in the element of the particular module.

One or more embodiments described in this Specification and/or recited in the claims may not be included in this General Overview section.

2. Architectural Overview

Figure 1:
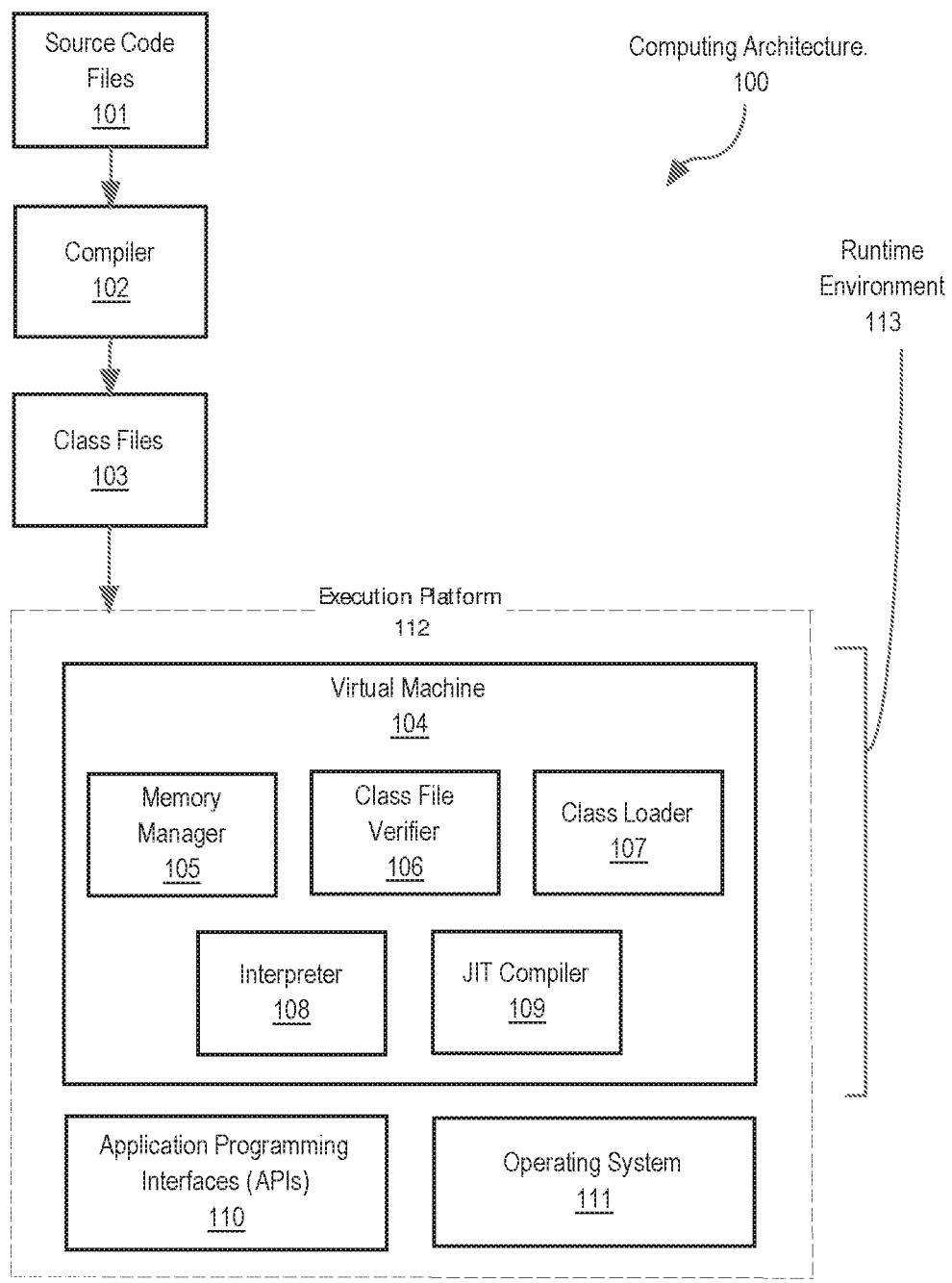
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the logical, human-readable, function-driven form used by the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code (i.e., without additional processing required to determine which data structures to use and which steps to use of those available to the virtual machine). Converting source code to virtual machine instructions includes mapping source code functionality from the language to virtual machine functionality that utilizes underlying resources, such as data structures. Often, functionality that is presented in a logical, human-readable, function-driven form via source code by the programmer is converted into more complex machine-centric steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code avoids this cost penalty at run-time to improve run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. In many dynamic languages (such as Java), the language is designed to allow code to be inserted during the program's execution such that compilation ahead-of-time can lead to inefficiencies. When a program is interpreted, the code of the program is read line-by-line and converted to machine-level instructions while the program is executing. As a result, the program has a shorter startup time (as compared with code that is loaded and compiled in full before execution begins, since it can begin executing without the delay of loading and compiling in full), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. In some examples, programs spend a disproportionate amount of time executing a small portion of a larger body of executing code. For this reason, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In one example, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

In the following example, each of the class files 103 represents a respective "class" defined in the source code files 101 (or dynamically generated by the compiler 102/virtual machine 104). However, in other examples, the class file may represent multiple classes, depending on a variety of factors. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
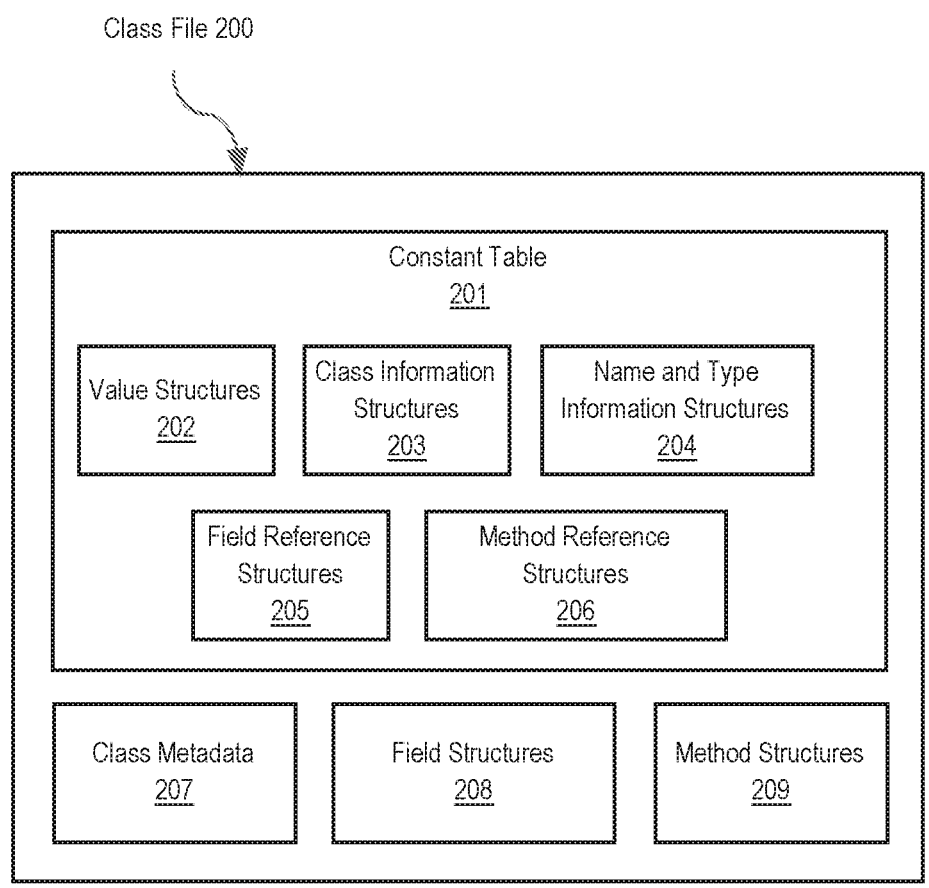
FIG. 2 is a block diagram illustrating an embodiment of a computer system suitable for implementing methods and features described herein.

FIG. 2 illustrates an example structure for a class file 200 in block diagram form according to an embodiment. In one example, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. A symbol table is a data structure that stores information about each symbol (i.e., identifier) that appears in source code. In a class file 200, the constant table 201 stores information about identifiers that appear in the source code for that class. A linker may rely on entries in the constant table 201 to resolve the identifiers. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth. In object-oriented programming, a subclass is a class that extends another class, which is referred to as its superclass. A subclass inherits functionality of its superclass, such as fields, methods, interfaces, etc. In addition, a subclass may introduce additional functionality and/or override functionality inherited from a superclass. A system of superclasses and subclasses may be referred to as an inheritance hierarchy or "tree." A superclass may be referred to as a "parent" or "ancestor" class of a subclass, and a subclass may be referred to as a "child" or "descendent" class of a superclass.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the base name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, accesses to constant values are shown in the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 supports a variety of run-time environments, regardless of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
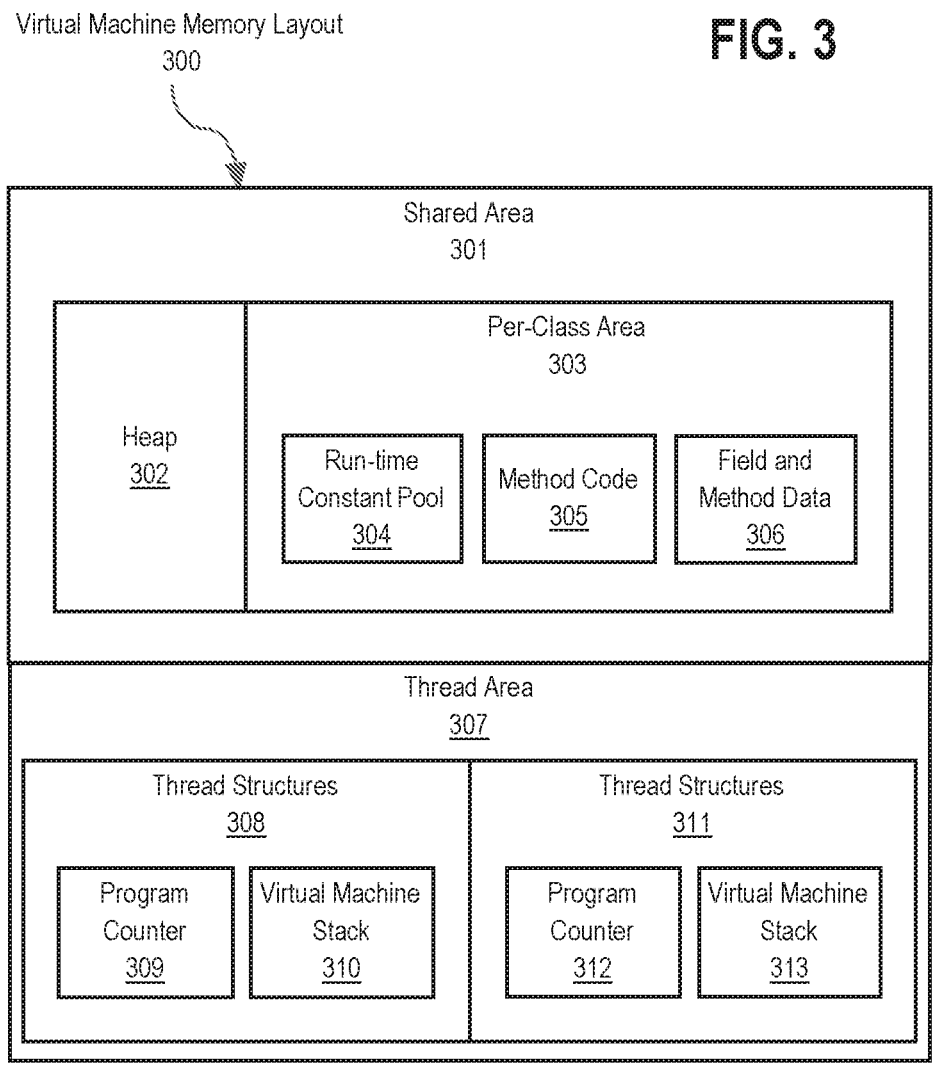
FIG. 3 illustrates an example virtual machine memory layout in block diagram form according to an embodiment.

FIG. 3 illustrates an example virtual machine memory layout 300 in block diagram form according to an embodiment. In one example, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In one example, the thread area 307 depicted in FIG. 3 assumes two threads are executing on the virtual machine 104. However, in a practical environment, the virtual machine 104 may execute any number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
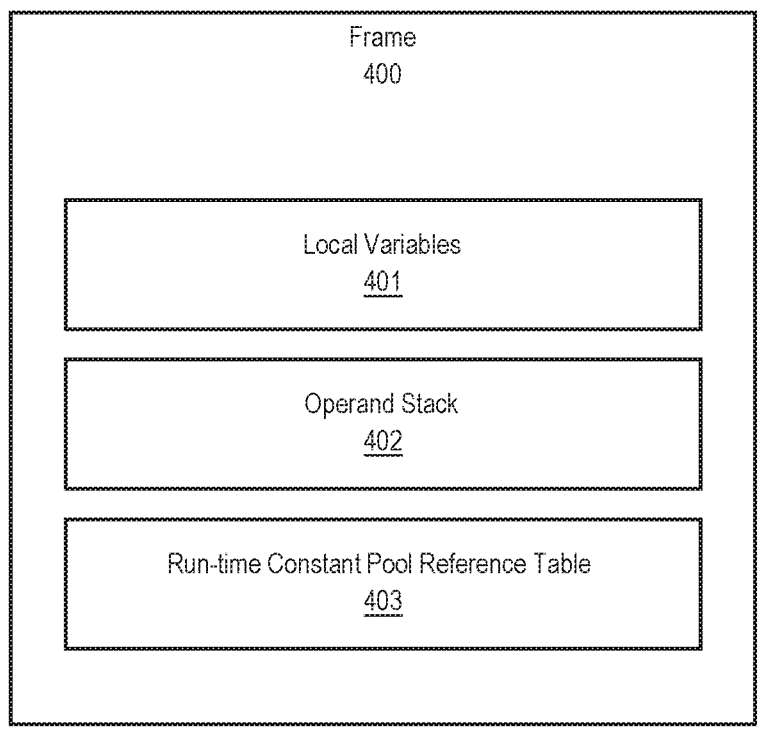
FIG. 4 illustrates an example frame in block diagram form according to an embodiment.

FIG. 4 illustrates an example frame 400 in block diagram form according to an embodiment. In the remaining examples, frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses. For symbols that reference other classes, the resolution mechanism may load classes as necessary to resolve symbols that have not yet been defined or resolved. In addition, the resolution mechanism translates variable accesses into appropriate offsets into storage structures associated with the run-time locations of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily" or on an as-needed basis) one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class (i.e., the class currently under evaluation by the class verification mechanism, when such mechanism is in place and running, as it traverses through evaluation of different classes) has correct access permissions for classes/fields/structures referenced in the constant pool 304, check that the virtual machine 104 code of methods will not cause unexpected behavior based on an expressed form of preferences by the programmer, in code, as the code was initially written (e.g., making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution on an as-needed basis, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Modules

FIG. 5 illustrates a module system 500 in block diagram form according to an embodiment. As illustrated in FIG. 5, the module system 500 includes two modules 502 and 512, and various components thereof. In one or more embodiments, the module system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a module 502 is a logical grouping of one or more packages. A module 502 may include a module descriptor 503 that specifies various features of the module 502. Specifically, the module descriptor 503 may specify a unique identifier for the module 502, such as an alphanumeric name or other form of identifier. Alternatively or in addition, the module descriptor 503 may specify one or more dependencies between the module 502 and one or more other modules. Alternatively or in addition, the module descriptor 503 may specify which packages are exposed to other modules, as described in further detail below. Alternatively or in addition, a module descriptor 503 may specify many other kinds of information and/or metadata associated with the module 502.

In an embodiment, an exposed package 504 is a package that one or more modules other than module 502 are able to access. Specifically, code in one or modules other than module 502 is able to access an application programming interface (API) of a class 506 in the exposed package 504. Alternatively or in addition to one or more classes, a package may include one or more other elements, such as interfaces, enumerations, annotation types, resources, or a combination thereof. In Java, a module may explicitly export a package using the exports keyword in the module descriptor. A private package 508 is a package that modules other than module 502 are unable to access. Specifically, although code within the module 502 is able to access an API of a class 510 in the private package 508, code in modules other than module 502 is unable to access the API of the class 510. Within a package, additional accessibility restrictions may apply. Accessibility may be specified separately at the field level, method level, class level, package level, module level, and/or any combination thereof.

In an embodiment, the module system 500 includes multiple modules. Another module 512 may include its own module descriptor 513. Alternatively or in addition, the module 512 may include one or more exposed packages 514, containing one or more classes 516 and/or other elements. Alternatively or in addition, the module 512 may include one or more private packages 518, containing one or more classes 520.

In an embodiment, packages are organized in a tree hierarchy. For example, in Java, the class java.awt.event.ActionEvent is in the package java.awt.event. In this example, the levels of the package tree hierarchy (Java, awt, and event) are delimited by periods. Any segment of the package tree hierarchy that starts at the top level may be referred to as a package-tree prefix. A package-tree prefix may also include the name of the package. For java.awt.event, the possible package-tree prefixes are Java, java.awt, and java.awt.event. In this example, java.awt.event is also a package name.

In an embodiment, in a module system 500, two or more packages in the same module or different modules are permitted to share a package-tree prefix as long as they do not share the same package name. In the example above, two different packages are permitted to share the package-tree prefix java.awt, but two different packages are not permitted to have the package name java.awt.event. Two different packages with the same name may be referred to as a split package. A split package may result in a load-time or runtime error. For example, in Java, a split package may be prohibited when two different modules, each including a package with the same name, are defined to the same class loader.

4. Examples of Package Tree Hierarchies

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6A:
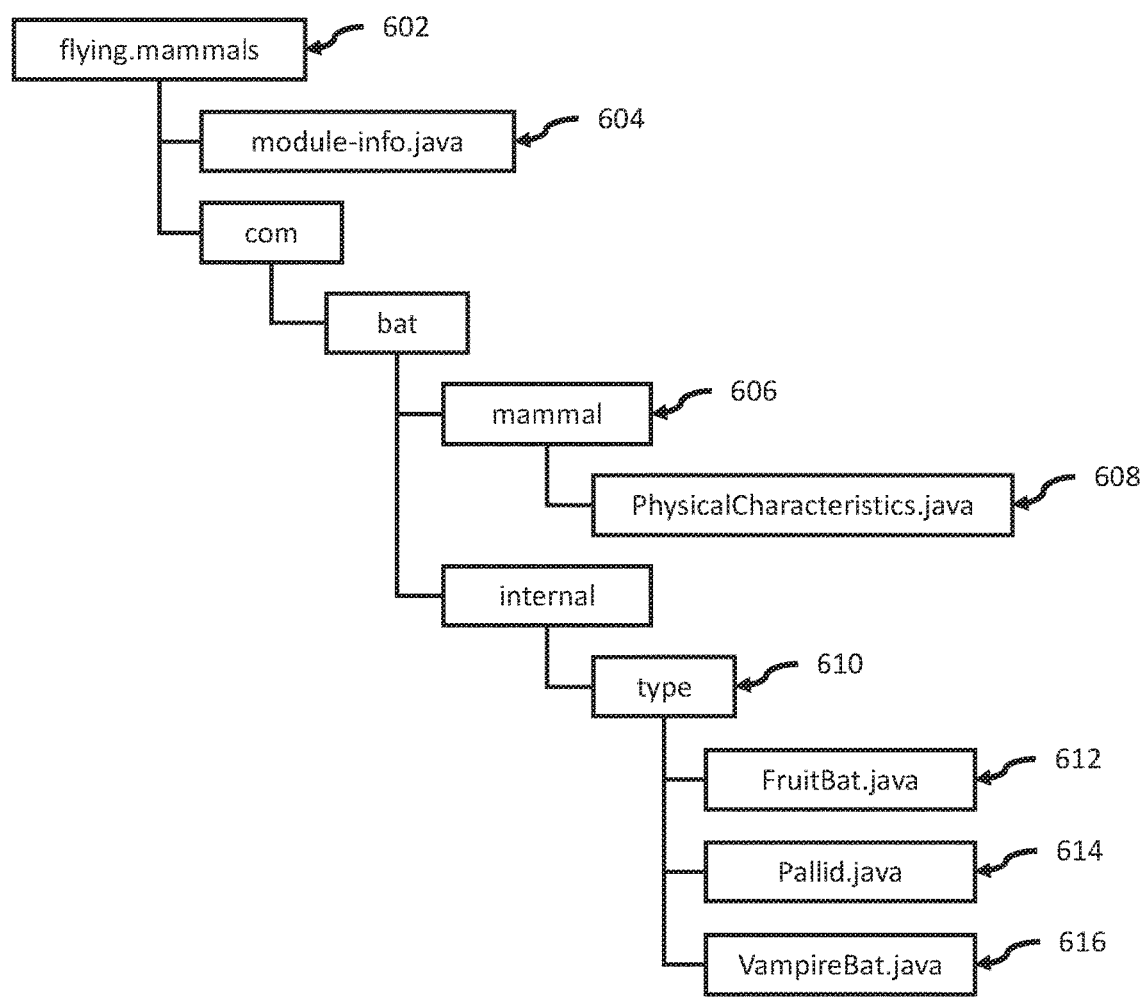
FIGS. 6A-6B illustrate examples of package tree hierarchies in block diagram form according to an embodiment.

FIG. 6A illustrates an example of a package tree hierarchy 600 in block diagram form according to an embodiment. Specifically, FIG. 6A illustrates a package tree hierarchy 600 within a module 602 named flying.mammals. The module 602 includes a module descriptor file 604 named module-info.java, which includes information about the module 602 as described above. In addition, the module 602 includes two packages: package 606 named com.bat.mammal; and package 610 named com.bat.internal.type. Package 606 includes an interface source code file 608 named PhysicalCharacteristics.java, which includes elements relating to features of bats (the mammal). For example, in source code form:

```
public interface PhysicalCharacteristics {
    int size( );
    int wingSpan( );
    int weight( );
    Color color( );
    public static PhysicalCharacteristics of(String batName) { ... }
}
```

Package 610 includes three class source code files 612, 614, 616 named FruitBat.java, Pallid.java, and Vampire-Bat.java, respectively. Package-tree prefixes for package 606 include com, com.bat, and com.bat.mammal. Package-tree prefixes for package 610 include com, com.bat, com.bat.internal, and com.bat.internal.type. The two packages 606, 610 share the package-tree prefixes com and com.bat. In this example, the module descriptor file 604 exposes package 606 to other modules but does not expose package 610 to other modules, as follows in source code form:

module flying.mammals { exports com.bat.mammal; }

Any packages that are not explicitly exposed to other modules, including package 610 under the package-tree prefix com.bat.internal, are private packages.

Figure 6B:
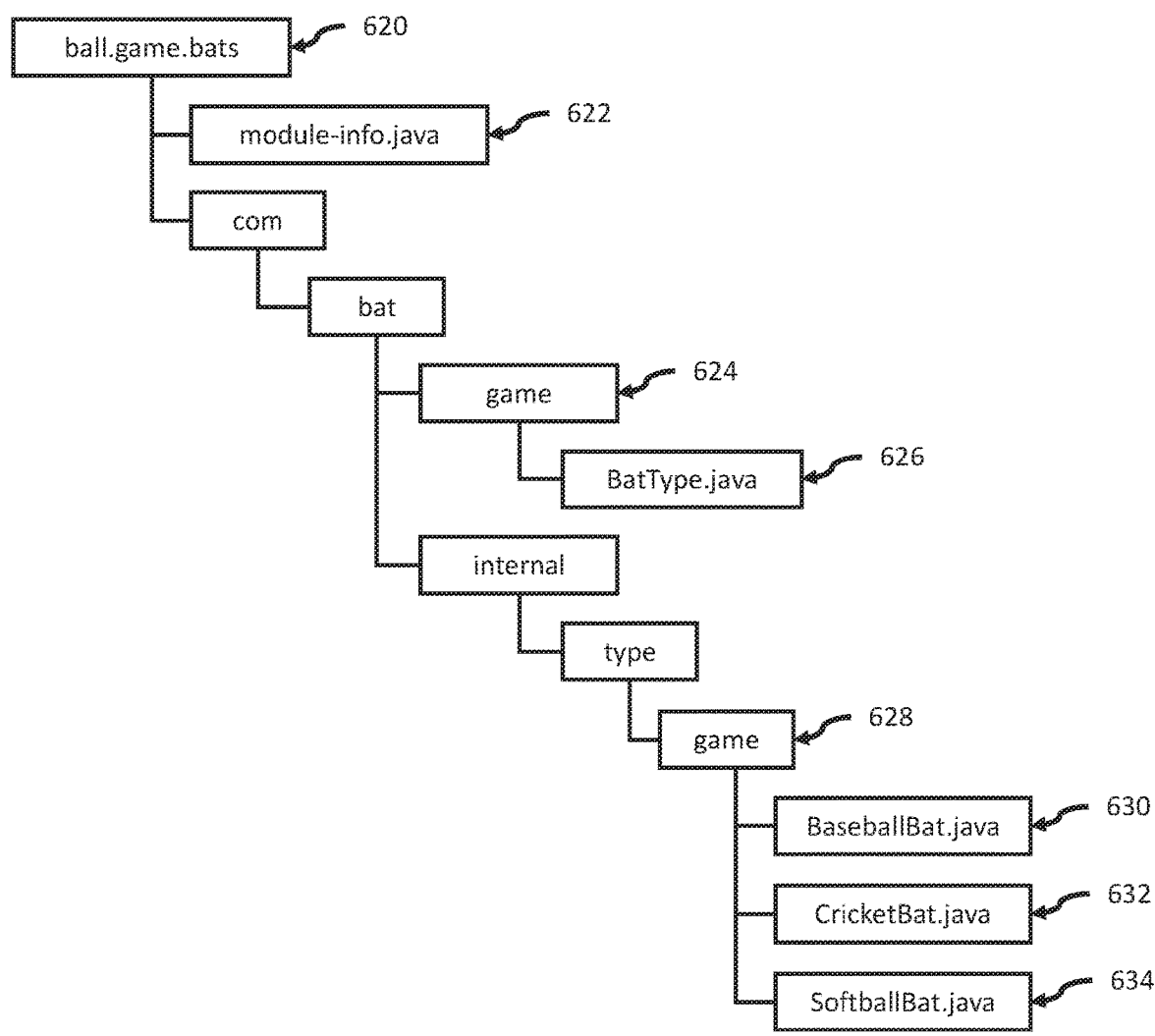

FIG. 6B illustrates an example of a package tree hierarchy 618 in block diagram form according to an embodiment. Specifically, FIG. 6B illustrates a package tree hierarchy 618 within a module 620 named ball.game.bats. The module 620 includes a module descriptor file 622 named module-info.Java, which includes information about the module 620 as described above. In addition, the module 620 includes two packages: package 624 named com.bat.game; and package 628 named com.bat.internal.type.game. Package 624 includes an interface source code file 626 named BatType.java, which includes elements relating to features of bats (the sports equipment). For example, in source code form:

```
public interface BatType {
    int length( );
    int diameter( );
    boolean isWooden( );
    boolean isMetal( );
    public static BatType fromName(String name) { ... }
}
```

Package 628 includes three class source code files 630, 632, 634 named FruitBat.java, Pallid.java, and Vampire-Bat.java, respectively. Package-tree prefixes for package 624 include com, com.bat, and com.bat.mammal. Package-tree prefixes for package 628 include com, com.bat, com.bat.internal, and com.bat.internal.type. The two packages 624, 628 share the package-tree prefixes com and com.bat. In this example, the module descriptor file 622 exposes package 624 to other modules but does not expose package 628 to other modules, as follows in source code form:

module ball.game.bats { exports com.bat.game; }

Any packages that are not explicitly exposed to other modules, including package 628 under the package-tree prefix com.bat.internal, are private packages.

In the examples illustrated in FIGS. 6A-6B, both modules 602, 620 are to be defined to the same class loader, by a module system. Various packages within and between the modules 602, 620 share package-tree prefixes. The package-tree prefixes com, com.bat, com.bat.internal, and com.bat.internal.type exist in both modules 602, 620. However, no two packages have the same name. When both modules 602, 620 are defined to the same class loader, by the module system, there are no split packages.

Although the modules 602, 620 do not include any split packages, the shared package-tree prefixes present a problem for a user attempting to configure test operations (in this example, assertions). As one example, a user is troubleshooting module 602 and wants to enable assertions for the package-tree prefix com.bat.internal.type. Module 620 also includes the package-tree prefix com.bat.internal.type. If a user enables assertions for the package-tree prefix com.bat.internal.type, assertions will be enabled for that package-tree prefix in both modules 602, 620. To enable assertions for the package-tree prefix com.bat.internal.type only in module 602, the user must also disable assertions for the more specific package-tree prefix com.bat.internal.type.game that is found only in module 620. If the user does not disable assertions for the package-tree prefix in module 620, then the set of code running with assertions enabled will not be limited to module 602 as intended.

In Java, to enable assertions for the package-tree prefix com.bat.internal.type only in module 602, a corresponding command line argument may be as follows:

```
-ea:com.bat.mammal...,com.bat.internal.type... -da
         com.bat.internal.type.game...
```

As the complexity of the module system increases, the complexity of command line arguments and/or other configuration approaches needed to enable and disable assertions for the appropriate package-tree prefixes and/or specific type names also increases. In addition, a user may not be aware of all the package-tree prefixes and/or type names that exist within all the modules in the module system. In the example above, for module 620, only the package-tree prefix com.bat.game is exposed to other modules. A user who knows all the exposed and private package-tree prefixes in module 602 may not have the same level of knowledge of module 620, and may not be aware that module 620 also includes the private package-tree prefix com.bat.internal.type. Thus, a user who enables assertions for the package-tree prefix com.bat.internal.type in module 602 may not realize that assertions in module 620 also have been enabled.

Inadvertently enabling test operations in a module, other than the intended module (i.e., the module for which a user intends to enable test operations), may result in a variety of problematic program behaviors at runtime. If test operations in an unintended module are not configured properly and are triggered, those test operations may prevent execution of code in the intended module. Alternatively or in addition, test operations in an unintended module may be configured properly but may be unrelated to the work the user is attempting to perform in the intended module. Alternatively or in addition, due to the complexity of configurations (e.g., command line arguments) needed to enable test operations for the desired package-tree prefix(es) and/or type name(s) only in the intended module, a user may inadvertently enter an incorrect configuration and fail to enable test operations in an intended module. Alternatively or in addition, the package-tree prefixes and/or type names within a module may change from one version of the module to the next. Thus, a set of commands that correctly configures test operations, on a package-tree prefix and/or type name basis, for one version of a module may not work properly for another version of the module. Many different kinds of problematic program behaviors may occur.

5. Configuring Test Operations on a Per-Module Basis

Figure 7:
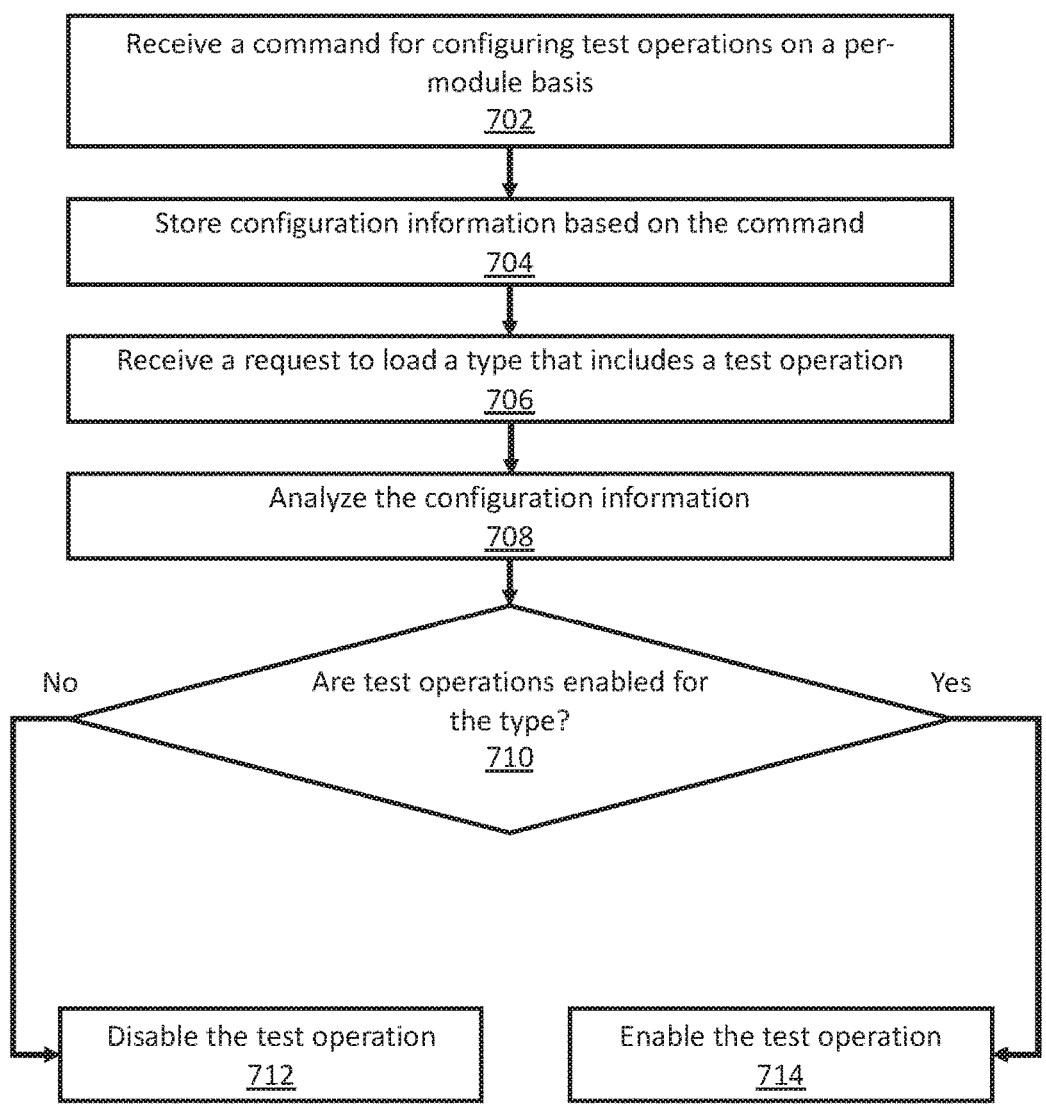
FIG. 7 illustrates a set of operations for configuring test operations on a per-module basis according to an embodiment.

FIG. 7 illustrates an example set of operations for configuring test operations on a per-module basis, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, a system receives a command for configuring test operations on a per-module basis (Operation 702). The command indicates that test operations should be enabled or disabled for a particular module. In an embodiment, test operations are enabled unless explicitly disabled by a command. Alternatively, test operations may be disabled unless explicitly enabled by a command. In addition, the command may indicate a particular kind of test operation to enable or disable. The command may take the form a command line interface (CLI) argument typed by a user at a command line prompt, as part of a command to load modules into a runtime environment. The CLI argument may designate a scope of types, for which test operations are to be enabled or disabled, according to a predefined argument syntax. For example, a module name, and optionally a package-tree prefix within that module, may be designated using the syntax '<module.name>/[optional.package-tree]'. The CLI argument may include one or more wildcards, as discussed below. Examples of CLI arguments are provided in FIG. 8, discussed in further detail below.

Alternatively or in addition, the command may take the form of an entry in a configuration file, an API call to the system, user input to an integrated development environment (IDE) (e.g. to change a setting via a user interface supplied by the IDE), or some other kind of command that indicates a module for which to enable or disable test operations, or a combination thereof. The command may indicate multiple modules for which to enable or disable test operations, respectively. Alternatively or in addition, the command may indicate one or more particular package-tree prefixes, within a designated module, for which to enable or disable test operations.

In an embodiment, the system stores configuration information based on the command (Operation 704). The configuration information includes a record of which test operation(s) are enabled or disabled for one or more particular modules, package-tree prefixes within the one or modules, or any combination thereof, based on the command. The configuration information may take many different forms. The configuration information may include a list of module names and the desired configuration (enabled or disabled) for each module name listed. Alternatively or in addition, the configuration information may include a list of type names and the desired configuration for each type name listed. Alternatively or in addition, the configuration information may include a list of package-tree prefix and the desired configuration for each package-tree prefix listed. Alternatively or in addition, the configuration information may include a default configuration for any module, type, and/or package-tree prefix that is not explicitly listed. The configuration status for a particular module, package-tree prefix, or type may be stored as a single bit (e.g., zero or one), a text value (e.g., 'true' or 'false') or according to some other syntax that differentiates between enabling and disabling test operations.

In an embodiment, the system store the configuration information in volatile storage such as random access memory (RAM). Alternatively or in addition, the module system may store the configuration information in persistent storage, such as in a file or database stored on a hard disk drive or solid state drive. In an embodiment, the system stores configuration information for multiple modules in a single storage location. Alternatively or in addition, the system may store configuration information for each module in corresponding different storage locations. Alternatively or in addition, the system may store configuration information in association with particular elements within modules, such as particular packages and/or types. The configuration information may be stored by a class loader, virtual machine, and/or any other system component.

In an embodiment, the system receives a request to load a type that includes a test operation (Operation 706). The system may include a class loader that receives a request to load a type. Upon receiving the request, the system analyzes configuration information (e.g., configuration information stored as described above with respect to Operation 704), to identify configuration information that is pertinent to the type being loaded (Operation 708). For example, the system may analyze the configuration information to identify configuration information that is pertinent to a module that includes the type, a package-tree prefix that includes the type, or the type itself.

In an embodiment, the configuration information includes one or more wildcard patterns. A wildcard pattern uses one or more symbols to represent multiple possible matches, without spelling out each possible match individually. A wildcard pattern may include a symbol that matches any single character (e.g., '?'), a symbol that matches any sequence of characters (e.g., '*' or ' . . . '), a series of characters within brackets that matches any of the characters within the brackets (e.g., '[xyz]'), any other kind of wildcard symbol, or any combination thereof. To analyze the configuration information, the system may perform pattern recognition to determine whether the configuration information matches the type that is to be loaded. Examples of command line interface arguments using wildcards are discussed below with respect to FIG. 8.

In an embodiment, the system first determines whether the configuration information indicates a configuration for the specific type to be loaded. If the configuration information does not indicate a configuration for the specific type to be loaded, the system may determine whether the configuration information indicates a configuration for a package-tree prefix that includes the type. If the configuration information does not indicate a configuration for a package-tree prefix that includes the type, the system may determine whether the configuration information indicates a configuration for the module that includes the type. If the configuration information does not indicate a configuration for the module that includes the type, the system may use a default configuration.

In an embodiment, based on analysis of the configuration information, the system determines whether test operations are enabled for the type to be loaded (Operation 710). As noted above, test operations may be enabled on a per-module basis. In addition, test operations may be enabled on a per-package-tree prefix basis, or on a per-type basis. As one example, the configuration information may indicate that test operations (e.g., assertions) are enabled for all types in a particular module, including all packages in that module. As another example, the configuration information may indicate that test operations are enabled only for types in packages with one or more particular package-tree prefixes, within the designated module(s). As another example, the configuration information may indicate that test operations are enabled only for one or more specific type names within the designated module(s). If the configuration information does not explicitly indicate whether test operations are enabled or disabled for a particular type, the system may use a default configuration (enabled or disabled).

In an embodiment, the system supports multiple kinds of test operations that are separately configurable. The system may determine, for each kind of test operation that is configurable, whether that kind of test operation is enabled for the type to be loaded. For example, the system may support enabling and/or disabling assertions and log statements, with the two kinds of test operations being separately configurable. In this example, upon receiving a request to load a type, the system may analyze the configuration information and separately determine whether (a) assertions are enabled for that type and/or (b) log statements are enabled for that type. Alternatively, the system may support multiple kinds of test operations that must all be enabled or disabled collectively. Alternatively, the system may only support enabling or disabling a single kind of test operation. For example, the system may only support enabling or disabling assertions.

In an embodiment, if the configuration information indicates that test operations (or a particular kind of test operation in question) are enabled, then the system enables the test operation in the type to be loaded (Operation 714). Enabling the test operation means that when the system encounters the test operation at runtime, the system executes the test operation. For example, if the test operation is an assertion, the system evaluates the assertion. Alternatively, if the configuration information indicates that test operations (or a particular kind of test operation in question) are disabled, then the system disables the test operation in the type to be loaded (Operation 712). Disabling the test operation means that when the runtime encounters a location in code where the test operation, if enabled, would be executed, the system does not execute the test operation. Enabling and/or disabling test operations does not modify the execution of other code that is recited inline with the test operations. For example, disabling a test operation in a particular method does not prevent the rest of the method from executing.

Configuring test operations on a per-module basis may help avoid problems associated with configuring test operations based only on package-tree prefixes and/or specific type names. For example, referring to the example above in FIGS. 6A-6B, a user who is troubleshooting module 602 and wants to enable assertions for the package-tree prefix can enable assertions only in module 602, or only for the package-tree prefix com.bat.internal.type within module 602. By configuring test operations on a per-module basis, the user avoids the risk of inadvertently enabling test operations in a package of another module (e.g., package 628 in the example above) that shares the same package-tree prefix. In addition, because enabling test operations on a per-module basis is less complex than trying to avoid conflicts by enabling and/or disabling test operations for multiple package-tree prefixes, the user may avoid inadvertently misconfiguring test operations. In general, the user may avoid a variety of problematic behaviors at runtime that may result when test operations are not configurable on a per-module basis.

6. Examples of Command Line Interface Arguments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 8:
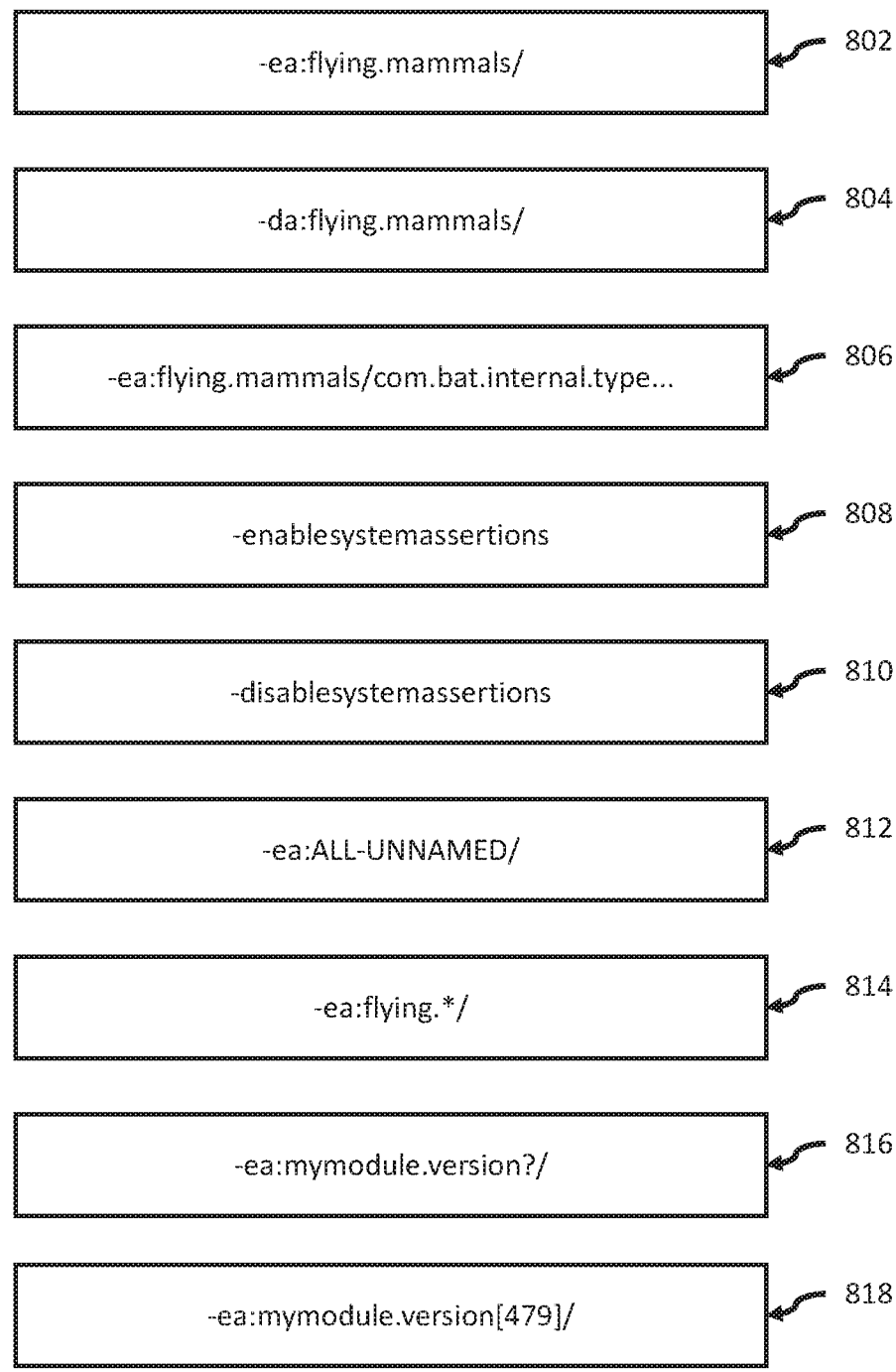
FIG. 8 illustrates examples of command line interface arguments according to an embodiment.

FIG. 8 illustrates examples of CLI arguments according to an embodiment. Specifically, FIG. 8 illustrates examples of CLI arguments that may be appended to CLI commands, such as a command to load a module system into a runtime environment. In these examples, the test operations to be enabled or disabled are assertions. Embodiments may support similar CLI commands for other kinds of test operations. In these examples, an argument that begins with '-ea:' enables assertions for all types in the designated scope. For example, CLI argument 802 enables assertions for all types in the module flying.mammals. An argument that begins with '-da:' disables assertions for all types in the designated scope. For example, CLI argument 804 disables assertions for all types in the module flying.mammals. CLI argument 806 enables assertions for all types that are under the package prefix com.bat.internal.type, within the module flying.mammals, without enabling assertions for types that have that same package prefix in other modules, per the example discussed above with respect to FIGS. 6A-6B.

In an embodiment, a single argument may be used to configure test operations for all modules that fall within a particular category of modules. As one example, a system may differentiate between test operations in modules that are part of the system's core API and test operations in user-defined modules. Java differentiates between system assertions (i.e., assertions in types within the system modules, such as those in the Java Development Kit (JDK)) and non-system assertions (i.e., assertions in user-defined types that are not within the system modules). CLI argument 808 enables assertions for all types in system modules, without enabling assertions for types in non-system modules. CLI argument 810 disables assertions for all types in system modules, without disabling assertions for types in non-system modules. As another example, a system may include one or more unnamed modules. Java typically includes one unnamed module per class loader, and a Java system may include multiple class loaders. CLI argument 812 enables assertions for all types in unnamed modules.

As discussed above, a CLI argument may include one or more wildcards. CLI argument 814 enables assertions for all modules with names that start with the flying. prefix, such as flying.mammals, flying.insects, flying.vehicles, etc. CLI argument 816 enables assertions for all modules with names that start with mymodule.version, followed by a single character, such as mymodule.version1, mymodule.versionB, etc. CLI argument 816 would not match a module named mymodule.version10. CLI argument 818 matches the modules named mymodule.version4, mymodule.version7, and mymodule.version9. Many different kinds of wildcards, or combinations thereof, may be used.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
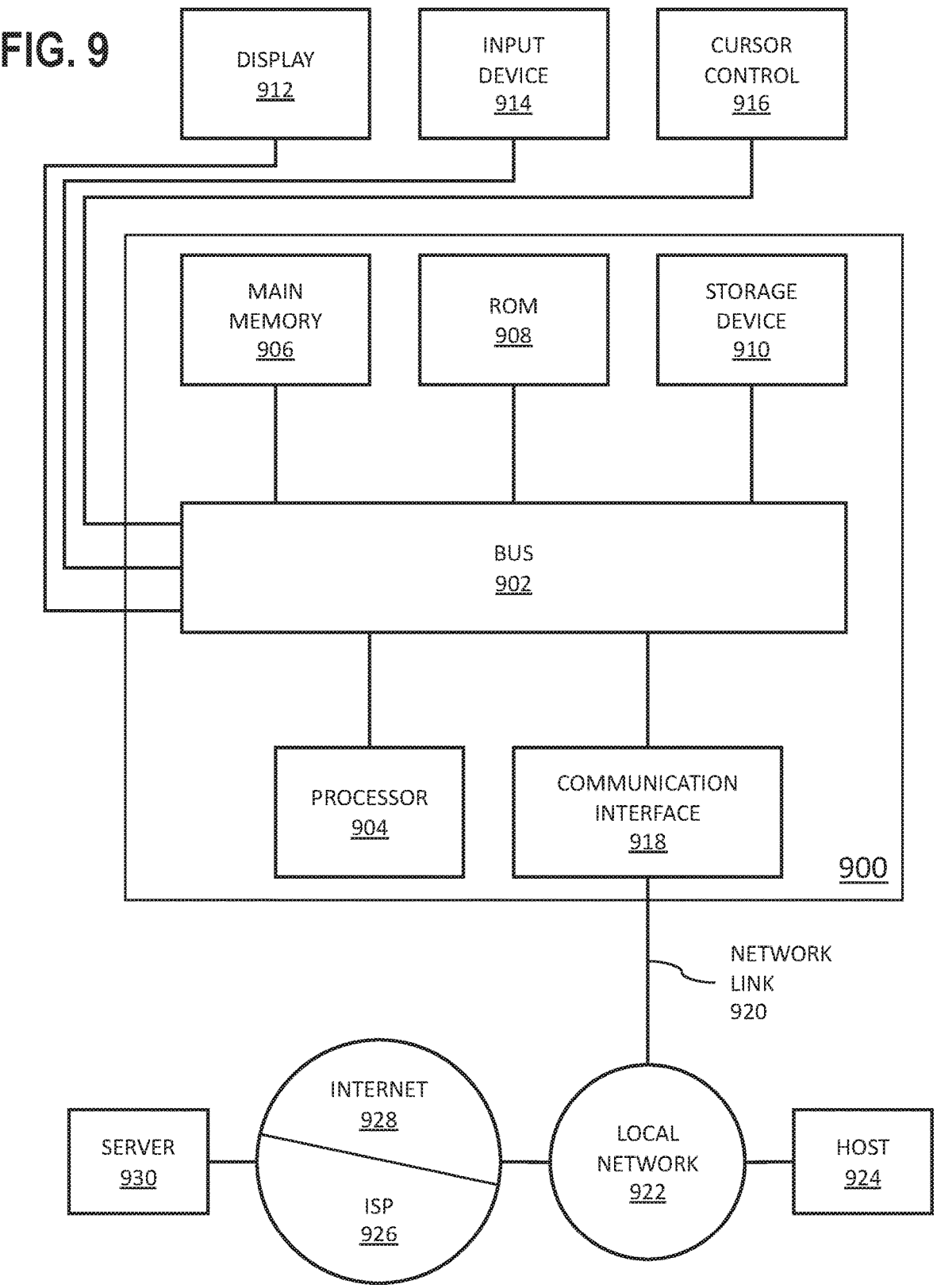
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or in addition, the computer system 900 may receive user input via a cursor control 916, such as a mouse, a trackball, a trackpad, a touchscreen, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. The display 912 may be configured to receive user input via one or more pressure-sensitive sensors, multi-touch sensors, and/or gesture sensors. Alternatively or in addition, the computer system 900 may receive user input via a microphone, video camera, and/or some other kind of user input device (not shown).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 900 can receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of steps comprising:
storing configuration information indicating that a disable test operations configuration is associated with a first module;
wherein modular-level accessibility to each of a plurality of modules comprising the first module is defined at least in part by a respective descriptor corresponding to each of the plurality of modules;
based on the disable test operations configuration associated with the first module:
disabling a plurality of test operations recited in a first set of code corresponding to the first module without disabling one or more other operations recited in the first set of code corresponding to the first module;
wherein one or more test operations recited in a second set of code corresponding to a second module are enabled.

2. The medium of claim 1, wherein the steps further comprise:
receiving a command to set the disable test operations configuration;
wherein storing the configuration information indicating that the disable test operations configuration is associated with the first module is responsive to receiving the command.

3. The medium of claim 2, wherein the command specifies a pattern or rule that is used to identify the first module.

4. The medium of claim 2, wherein the command explicitly specifies the first module.

5. The medium of claim 2, wherein the command comprises one or more of a command line argument, text in a configuration file, an application programming interface (API) call, and user input to an integrated development environment (IDE).

6. The medium of claim 2, wherein the command comprises a package prefix for a plurality of packages of the particular module.

7. The medium of claim 6, wherein the second module comprises a package having the package prefix, and wherein the one or more test operations recited in the second set of code corresponding to the second module, which are enabled, are in the package having the package prefix.

8. The medium of claim 2, wherein the command requests setting the disable test operations configuration for each of a plurality of system modules provided in a software development kit and does not apply to non-system modules.

9. The medium of claim 1, wherein at least one of the plurality of test operations is recited in a type in a package of the first module.

10. The medium of claim 9, wherein the type comprises one of an interface or a class.

11. The medium of claim 9, wherein at least another of the plurality of test operations is recited in another type in the package of the first module.

12. The medium of claim 1, wherein the configuration information includes a respective indication of whether a test operations configuration is disabled or enabled for each of the plurality of modules.

13. The medium of claim 1, wherein the configuration information indicates that the disable test operations configuration is associated with one of a package of a third module or a type in the package of the third module.

14. The medium of claim 1, wherein the configuration information is stored by a class loader.

15. The medium of claim 1, wherein the configuration information is stored by a virtual machine executing operations associated with the particular module.

16. The medium of claim 1, wherein disabling the plurality of test operations is responsive at least to:
receiving, by a class loader, a request to load a type that is from the first module, wherein the type comprises the plurality of test operations;
analyzing, by the class loader, the configuration information to determine that the disable test operations configuration is associated with the first module.

17. The medium of claim 1, wherein at least one of the plurality of test operations comprises an assertion.

18. The medium of claim 1, wherein at least one of the plurality of test operations evaluates to a true or false Boolean value based on whether a corresponding test passes or fails.

19. The medium of claim 1, wherein the steps further comprise:
executing the first set of code, wherein executing the first set of code comprises:
encountering a first location, within the first set of code, corresponding to a first test operation of the plurality of test operations;
refraining from executing the first test operation based on the disable test operations configuration associated with the first module;
encountering a second location, within the first set of code, corresponding to a first operation of the one or more other operations;
executing the first operation.

20. A system comprising:
at least one device including a hardware processor;
the system being configured to perform operations comprising:
storing configuration information indicating that a disable test operations configuration is associated with a first module;
wherein modular-level accessibility to each of a plurality of modules comprising the first module is defined at least in part by a respective descriptor corresponding to each of the plurality of modules;
based on the disable test operations configuration associated with the first module:
disabling a plurality of test operations recited in a first set of code corresponding to the first module without disabling one or more other operations recited in the first set of code corresponding to the first module;
wherein one or more test operations recited in a second set of code corresponding to a second module are enabled.

21. A method comprising:
storing configuration information indicating that a disable test operations configuration is associated with a first module;
wherein modular-level accessibility to each of a plurality of modules comprising the first module is defined at least in part by a respective descriptor corresponding to each of the plurality of modules;
based on the disable test operations configuration associated with the first module:
 disabling a plurality of test operations recited in a first set of code corresponding to the first module without disabling one or more other operations recited in the first set of code corresponding to the first module;
wherein one or more test operations recited in a second set of code corresponding to a second module are enabled;
wherein the method is performed by at least one device including a hardware processor.

\* \* \* \* \*

UNITED STATES PATENT AND TRADEMARK OFFICE
CERTIFICATE OF CORRECTION

| | | |
|---|---|---|
| PATENT NO. | : 11,886,326 B2 | |
| APPLICATION NO. | : 16/135210 | |
| DATED | : January 30, 2024 | |
| INVENTOR(S) | : Hegarty et al. | |

It is certified that error appears in the above-identified patent and that said Letters Patent is hereby corrected as shown below:

In the Specification

In Column 13, Line 19, delete "Java," and insert -- java, --, therefor.

Signed and Sealed this
Fourteenth Day of May, 2024

Katherine Kelly Vidal
*Director of the United States Patent and Trademark Office*